United States Patent
Sifford et al.

(10) Patent No.: US 10,762,504 B2
(45) Date of Patent: Sep. 1, 2020

(54) SYSTEM FOR EXTERNAL SECURE ACCESS TO PROCESS DATA NETWORK

(71) Applicant: BANK OF AMERICA CORPORATION, Charlotte, NC (US)

(72) Inventors: Eric Eugene Sifford, Charlotte, NC (US); Joseph Benjamin Castinado, North Glenn, CO (US); Richard Huw Thomas, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 891 days.

(21) Appl. No.: 15/050,379

(22) Filed: Feb. 22, 2016

(65) Prior Publication Data

US 2017/0243215 A1 Aug. 24, 2017

(51) Int. Cl.
*G06Q 40/00* (2012.01)
*G06Q 20/40* (2012.01)
*G06Q 20/10* (2012.01)
*H04L 9/32* (2006.01)

(52) U.S. Cl.
CPC ........... *G06Q 20/401* (2013.01); *G06Q 20/10* (2013.01); *H04L 9/3236* (2013.01); *G06Q 2220/00* (2013.01); *H04L 2209/38* (2013.01); *H04L 2209/56* (2013.01)

(58) Field of Classification Search
CPC .................................................. G06Q 40/00
USPC ......................................................... 705/44
See application file for complete search history.

(56) References Cited

U.S. PATENT DOCUMENTS

| 5,671,283 A | 9/1997 | Michener et al. |
| 5,835,599 A | 11/1998 | Buer |
| 6,073,234 A | 6/2000 | Kigo et al. |
| 6,324,286 B1 | 11/2001 | Lai et al. |

(Continued)

FOREIGN PATENT DOCUMENTS

| WO | 2014162296 A1 | 10/2014 |
| WO | 2015135018 A1 | 9/2015 |

OTHER PUBLICATIONS

Malahov, Yanislav Georgiev, "BitAlias 1, AKA Usernames for Bitcoin, A New, Simple Naming System for Bitcoin Addresses", retrieved from the Internet:<URL: https://medium.com/bitalias-decentralized-naming-and-identity-service/bitalias-7b66bffed9d8#.ww4r3h4sn> on Mar. 12, 2017; Bringing Crypto to the People, Founder of www.aeternity.com, Jun. 6, 2015, 6 pages.

(Continued)

*Primary Examiner* — Ojo O Oyebisi
(74) *Attorney, Agent, or Firm* — Michael A. Springs; Moore & Van Allen PLLC; Nicholas C. Russell

(57) ABSTRACT

A closed-loop system is operatively connected with a block chain distributed network for using the block chain distributed network for facilitating operation of a transaction record sharing system. Host and source institutions function to supply a consolidated transaction record to a user in response to a request from a user to the host institution. The request is determined to meet a condition of the block chain thereby verifying the request. The verified request for a transaction record is transmitted to at least one source institution. The transaction record of the source institution is accessed by the host institution. A consolidated transaction record is communicated to the user based on the transaction record.

20 Claims, 9 Drawing Sheets

(56) References Cited

U.S. PATENT DOCUMENTS

| | | |
|---|---|---|
| 6,725,303 B1 | 4/2004 | Hoguta et al. |
| 6,850,252 B1 | 2/2005 | Hoffberg |
| 6,973,187 B2 | 12/2005 | Gligor et al. |
| 7,055,039 B2 | 5/2006 | Chavanne et al. |
| 7,092,400 B2 | 8/2006 | Malzahn |
| 7,184,549 B2 | 2/2007 | Sorimachi et al. |
| 7,362,859 B1 | 4/2008 | Robertson et al. |
| 7,392,384 B2 | 6/2008 | Hopkins et al. |
| 7,428,306 B2 | 9/2008 | Celikkan et al. |
| 7,502,933 B2 | 3/2009 | Jakobsson et al. |
| 7,574,401 B1 | 8/2009 | Burns |
| 7,649,992 B2 | 1/2010 | Raju et al. |
| 7,764,788 B2 | 7/2010 | Tardo |
| 7,979,889 B2 | 7/2011 | Gladstone et al. |
| 8,078,874 B2 | 12/2011 | You et al. |
| 8,107,621 B2 | 1/2012 | Celikkan et al. |
| 8,155,311 B2 | 4/2012 | Shin et al. |
| 8,259,934 B2 | 9/2012 | Karroumi et al. |
| 8,358,781 B2 | 1/2013 | Schneider |
| 8,397,841 B1 | 2/2013 | Taylor et al. |
| 8,396,209 B2 | 3/2013 | Schneider |
| 8,416,947 B2 | 4/2013 | Schneider |
| 8,458,461 B2 | 6/2013 | Tardo |
| 8,464,320 B2 | 6/2013 | Archer et al. |
| 8,516,266 B2 | 8/2013 | Hoffberg et al. |
| 8,590,055 B2 | 11/2013 | Yoon et al. |
| 8,737,606 B2 | 5/2014 | Taylor et al. |
| 8,942,374 B2 | 1/2015 | Fujisaki |
| 8,983,063 B1 | 3/2015 | Taylor et al. |
| 9,059,866 B2 | 6/2015 | Bar-Sade et al. |
| 9,083,702 B2 | 7/2015 | Wied et al. |
| 9,092,766 B1 | 7/2015 | Bedier et al. |
| 9,298,806 B1 | 3/2016 | Vessenes et al. |
| 9,635,000 B1 | 4/2017 | Muftic |
| 9,672,499 B2 | 6/2017 | Yang et al. |
| 2003/0126094 A1 | 7/2003 | Fisher et al. |
| 2004/0172535 A1 | 9/2004 | Jakobsson et al. |
| 2004/0199463 A1 | 10/2004 | Deggendorf |
| 2005/0256802 A1 | 11/2005 | Ammermann et al. |
| 2007/0136573 A1 | 6/2007 | Steinberg |
| 2009/0281948 A1 | 11/2009 | Carlson |
| 2010/0279653 A1 | 11/2010 | Poltorak |
| 2011/0078073 A1 | 3/2011 | Annappindi |
| 2011/0197064 A1 | 8/2011 | Garcia Morchon et al. |
| 2012/0066121 A1 | 3/2012 | Shahbazi et al. |
| 2012/0096529 A1 | 4/2012 | Bournelle et al. |
| 2012/0271920 A1 | 10/2012 | Isaksson |
| 2012/0284175 A1 | 11/2012 | Wilson et al. |
| 2013/0198061 A1 | 8/2013 | Dheer et al. |
| 2013/0232056 A1 | 9/2013 | Schulman |
| 2013/0311375 A1 | 11/2013 | Priebatsch |
| 2014/0006185 A1 | 1/2014 | Zurn et al. |
| 2014/0089243 A1 | 3/2014 | Oppenheimer |
| 2014/0310171 A1 | 10/2014 | Grossman et al. |
| 2015/0052587 A1 | 2/2015 | O'Neill et al. |
| 2015/0172053 A1 | 6/2015 | Schwarz et al. |
| 2015/0206106 A1 | 7/2015 | Yago |
| 2015/0262137 A1 | 9/2015 | Armstrong |
| 2015/0332283 A1 | 11/2015 | Witchey |
| 2015/0379510 A1 | 12/2015 | Smith |
| 2015/0379636 A1 | 12/2015 | Szabo et al. |
| 2016/0012424 A1 | 1/2016 | Simon et al. |
| 2016/0028552 A1 | 1/2016 | Spanos et al. |
| 2016/0035054 A1 | 2/2016 | Branscomb et al. |
| 2016/0050203 A1 | 2/2016 | Hefetz |
| 2016/0092874 A1 | 3/2016 | O'Regan et al. |
| 2016/0125376 A1 | 5/2016 | Beatty et al. |
| 2016/0125414 A1 | 5/2016 | Desai et al. |
| 2016/0191243 A1 | 6/2016 | Manning |
| 2016/0219045 A1 | 7/2016 | Toedter et al. |
| 2016/0260169 A1 | 9/2016 | Arnold et al. |
| 2016/0275461 A1 | 9/2016 | Sprague et al. |
| 2016/0292672 A1 | 10/2016 | Fay et al. |
| 2016/0321654 A1 | 11/2016 | Lesavich et al. |
| 2016/0323109 A1 | 11/2016 | McCoy et al. |
| 2016/0342978 A1 | 11/2016 | Davis et al. |
| 2016/0342989 A1 | 11/2016 | Davis |
| 2016/0342994 A1 | 11/2016 | Davis |
| 2017/0005804 A1 | 1/2017 | Zinder |
| 2017/0011460 A1 | 1/2017 | Molinari et al. |
| 2017/0046526 A1 | 2/2017 | Chan et al. |
| 2017/0046651 A1 | 2/2017 | Lin et al. |
| 2017/0046652 A1 | 2/2017 | Haldenby et al. |
| 2017/0046664 A1 | 2/2017 | Haldenby et al. |
| 2017/0046680 A1 | 2/2017 | Crites |
| 2017/0046693 A1 | 2/2017 | Haldenby et al. |
| 2017/0046792 A1 | 2/2017 | Haldenby et al. |
| 2017/0053249 A1* | 2/2017 | Tunnell ................. G06F 21/36 |
| 2017/0085555 A1 | 3/2017 | Bisikalo et al. |
| 2017/0091397 A1 | 3/2017 | Shah |
| 2017/0103167 A1 | 4/2017 | Shah |
| 2017/0103461 A1 | 4/2017 | Acuña-Rohter et al. |
| 2017/0109735 A1 | 4/2017 | Sheng et al. |
| 2017/0116693 A1 | 4/2017 | Rae et al. |
| 2017/0132621 A1 | 5/2017 | Miller et al. |
| 2017/0132625 A1 | 5/2017 | Kennedy |
| 2017/0132626 A1 | 5/2017 | Kennedy |
| 2017/0132630 A1 | 5/2017 | Castinado et al. |
| 2017/0140375 A1 | 5/2017 | Kunstel |
| 2017/0140394 A1 | 5/2017 | Cao et al. |
| 2017/0142024 A1 | 5/2017 | Fromentoux et al. |
| 2017/0149796 A1 | 5/2017 | Gvili |
| 2017/0155515 A1 | 6/2017 | Androulaki et al. |
| 2017/0163733 A1 | 6/2017 | Grefen et al. |
| 2017/0177855 A1 | 6/2017 | Costa Faidella et al. |
| 2017/0178131 A1 | 6/2017 | Fernandez et al. |
| 2017/0178237 A1 | 6/2017 | Wong |
| 2017/0180134 A1 | 6/2017 | King |
| 2017/0200137 A1 | 7/2017 | Vilmont |
| 2017/0213209 A1 | 7/2017 | Dillenberger |
| 2017/0214675 A1 | 7/2017 | Johnsrud et al. |
| 2017/0214698 A1 | 7/2017 | Hughes et al. |
| 2017/0220998 A1 | 8/2017 | Horn et al. |
| 2017/0221052 A1 | 8/2017 | Sheng et al. |
| 2017/0223005 A1 | 8/2017 | Birgisson et al. |
| 2017/0228447 A1 | 8/2017 | Catania et al. |
| 2017/0228822 A1 | 8/2017 | Creighton et al. |
| 2017/0230378 A1 | 8/2017 | Bliss |
| 2017/0232300 A1 | 8/2017 | Tran et al. |
| 2017/0235955 A1 | 8/2017 | Barkan |
| 2017/0236407 A1 | 8/2017 | Rhoads et al. |
| 2017/0243020 A1 | 8/2017 | Dhondse et al. |
| 2018/0053161 A1 | 2/2018 | Bordash et al. |
| 2018/0268479 A1 | 9/2018 | Dowling et al. |

OTHER PUBLICATIONS

International Search Report completed on Mar. 12, 2017 and International Written Opinion completed on Mar. 11, 2017 for International application No. PCT/IB 16/01655 dated Apr. 7, 2017.

Provisional Application filed Dec. 10, 2015 by Arjomand et al., "Attributable Digital Currency"; Nov. 21, 2017 in U.S. Appl. No. 15/049,777.

Buterin, Vitalik, "On Public and Private Blockchains", Aug. 7, 2015, https://blog.ethereum.org/2015/08/07/on-public-and-private-blockchains/.

International Search Report and Written Opinion for International Application No. PCT/US2016/061402 completed Dec. 27, 2016.

Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_Tasca/publication/290805276 Digital Currencies Principles Trends Opportunities and Risks/links/569bb91e08ae6169e5624552.pif> p. 5, 10, 12, 14.

Lerner. "MAVEPAY a new lightweight payment scheme for peer to peer currency networks." Apr. 17, 2012 (Apr. 17, 2012) Retrieved from <https://pdfs.semanticscholar.org/1185/a26f014678b959876519065c2624458d75b8.pdf>, entire document.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

(56) References Cited

OTHER PUBLICATIONS

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY2015_RICHARD_LEE_TWESIGE/links/54a7836f0cf267bdb90a0ee6.pdf.

* cited by examiner

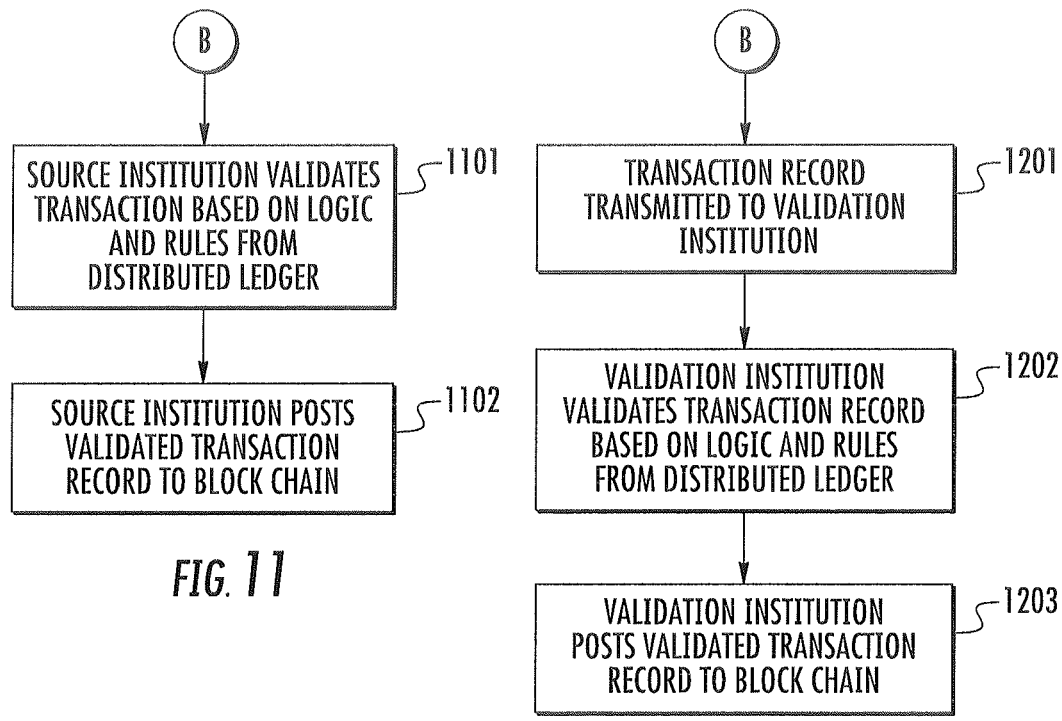
FIG. 11
FIG. 12
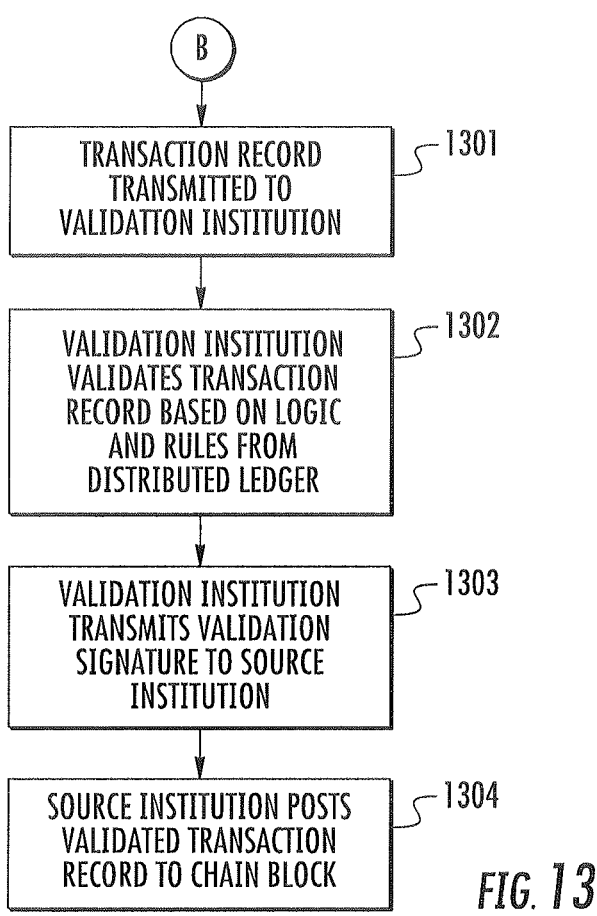
FIG. 13

SYSTEM FOR EXTERNAL SECURE ACCESS TO PROCESS DATA NETWORK

BACKGROUND

Systems for providing on-line transactions are known where a user may engage in transactions with multiple unrelated parties such as unrelated financial institutions. In order to access information relating to the transactions from the different unrelated parties the user may be required to access the transaction information from each financial institution individually. Alternatively, an aggregator may access the information from the different unrelated parties on behalf of the user to provide a single access point for the user; however, the aggregator is unrelated to the financial institutions that are the sources of the information such that access to the transactional information may be limited and/or the transaction information of the financial institutions that are the sources of information may be retained and accessed by the unrelated aggregator.

BRIEF SUMMARY

Embodiments of the present invention address these and/or other needs by providing an innovative system, method and computer program product for operatively connecting with a block chain distributed network and using the block chain distributed network for facilitating the sharing of non-monetary information between financial institutions such that users may access a single access point to obtain a consolidated transaction record.

According to embodiments of the invention, a system is operatively connected with a block chain distributed network and uses the block chain distributed network to provide non-monetary transaction information to a user. The system comprises a memory device storing logic and rules for the block chain and a processing device operatively coupled to the memory device. The processing device is configured to execute computer-readable program code to: receive a request for a consolidated transaction record from a user; determine whether the request meets a condition of the block chain thereby verifying the request; initiate the transmission of a verified request for a transaction record to at least one source institution; access the transaction record from the at least one source institution; and transmit the consolidated transaction record using the transaction record to a user computing device.

The processing device may be configured to execute computer-readable program code further to create the consolidated record comprising a plurality of transaction records. The processing device may be configured to execute computer-readable program code further to communicate the consolidated record to a user computing device. The processing device may be configured to execute computer-readable program code further to communicate verification of the request to the block chain distributed network. The processing device may be configured to execute computer-readable program code further to update a distributed ledger with information indicating verification of the request. The processing device may be configured such that initiation the transmission of a verified request by transmitting a verified request. The processing device may be configured such that initiation the transmission of a verified request by transmitting a request to a verification institution.

According to embodiments of the invention, a source system is operatively connected with a block chain distributed network and uses the block chain distributed network to facilitate the exchange of non-monetary transaction information of different member financial institutions with a user. The system comprises a memory device storing logic and rules for the block chain and a processing device operatively coupled to the memory device. The processing device is configured to execute computer-readable program code to receive a verified request for transaction record relating to a user; determine whether the request meets a condition of the block chain; and allow access to the transaction record by a host institution.

The processing device may be configured to execute computer-readable program code further to communicate verification of the request to the block chain distributed network. The processing device may be configured to execute computer-readable program code further to update a distributed ledger with information indicating verification of the request and provide access to the distributed ledger to the block chain distributed network.

According to embodiments of the invention, a method for execution on a closed-loop system operatively connected with a block chain distributed network for using the block chain distributed network for facilitating operation of a transaction record sharing system. The method comprises creating a transaction record relating to one or more user transactions; validating the transaction record in a block of the block chain; updating a distributed ledger stored in a memory device, wherein the distributed ledger is updated based on communications from a block chain distributed network; receiving a request for a consolidated transaction record from a user; determining whether the request meets a condition of the block chain thereby verifying the request; transmitting a verified request based on the consolidated transaction record to at least one source institution; accessing a transaction record from the at least one source institution; receiving a verified request for a transaction record; determining whether the request meets a condition of the block chain; allowing access to the transaction record by a host institution; and communicating the consolidated transaction record to a user.

The method may further comprise creating a consolidated record comprising a plurality of transaction records. The method may further comprise communicating the consolidated record to a user computing device. The method may further comprise communicating verification of the request to the block chain distributed network. The method may further comprise updating a distributed ledger with information indicating verification of the request. The step of determining whether the request meets a condition of the block chain may comprise transmitting the request to a validation institution. The step of determining whether the request meets a condition of the block chain may comprise receiving a signature from a validation institution. The step of transmitting a verified request for the transaction information may comprise transmitting the verified request from a verification institution. The step of transmitting a verified request for the transaction information may comprise transmitting the verified request from a host institution.

According to embodiments of the invention, a computer program product for execution on a system operatively connected with a block chain distributed network is provided. The computer program product uses the block chain distributed network for facilitating operation of a transaction record sharing system. The computer program product comprises at least one non-transitory computer-readable medium having computer-readable program code portions embodied therein. The computer-readable program code portions comprise an executable portion configured to create a transaction record relating to one or more user transactions; an executable portion configured to update a distributed ledger stored in a memory device, wherein the distributed ledger is updated based on communications from a block chain distributed network; an executable portion configured to receive a request for a consolidated transaction record from a user; an executable portion configured to determine whether the request meets a condition of the block chain thereby verifying the request; an executable portion configured to transmit a verified request for a transaction record to at least one source institution; an executable portion configured to access the transaction record from the at least one source institution; an executable portion configured to receive a verified request for information wherein the request comprises a request for a consolidated transaction record from a user; an executable portion configured to determine whether the request meets a condition of the block chain; an executable portion configured to allow access to the transaction record by a host institution; and an executable portion configured to communicate the consolidated transaction record to a user.

BRIEF DESCRIPTION OF THE DRAWINGS

FIG. 11 is a flowchart illustrating a method of validating a transaction record, in accordance with embodiments of the invention.

FIG. 12 is a flowchart illustrating another method of validating a transaction record, in accordance with embodiments of the invention.

FIG. 13 is a flowchart illustrating still another method of validating a transaction record, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asset management firms, insurance companies and the like.

Embodiments of the present invention provide a system and method for using a block chain configuration to allow financial institutions to exchange non-monetary transaction information with one another without a central source. The block chain can place transaction information onto a block chain "closed-loop" such that member financial institutions of the closed-loop block chain may access the transactional information of other members of the closed-loop block chain. Non-monetary transaction information or records means historical transaction information such as account balances, account activity, purchase activity, payment activity and the like and is distinguished from the underlying monetary transactions such as settling of accounts, payments, debits, credits, fund transfers and the like. The block chain is used to share historical transaction information such as a user's transaction record rather than to effectuate the actual monetary transaction. In some cases, the financial institution and/or third parties can validate information using an authentication key or signature. The authentication key or signature is recognized by other member institutions and certifies the authenticity of the information. The authentication key or signature may be unique to the member institution.

Figure 1:
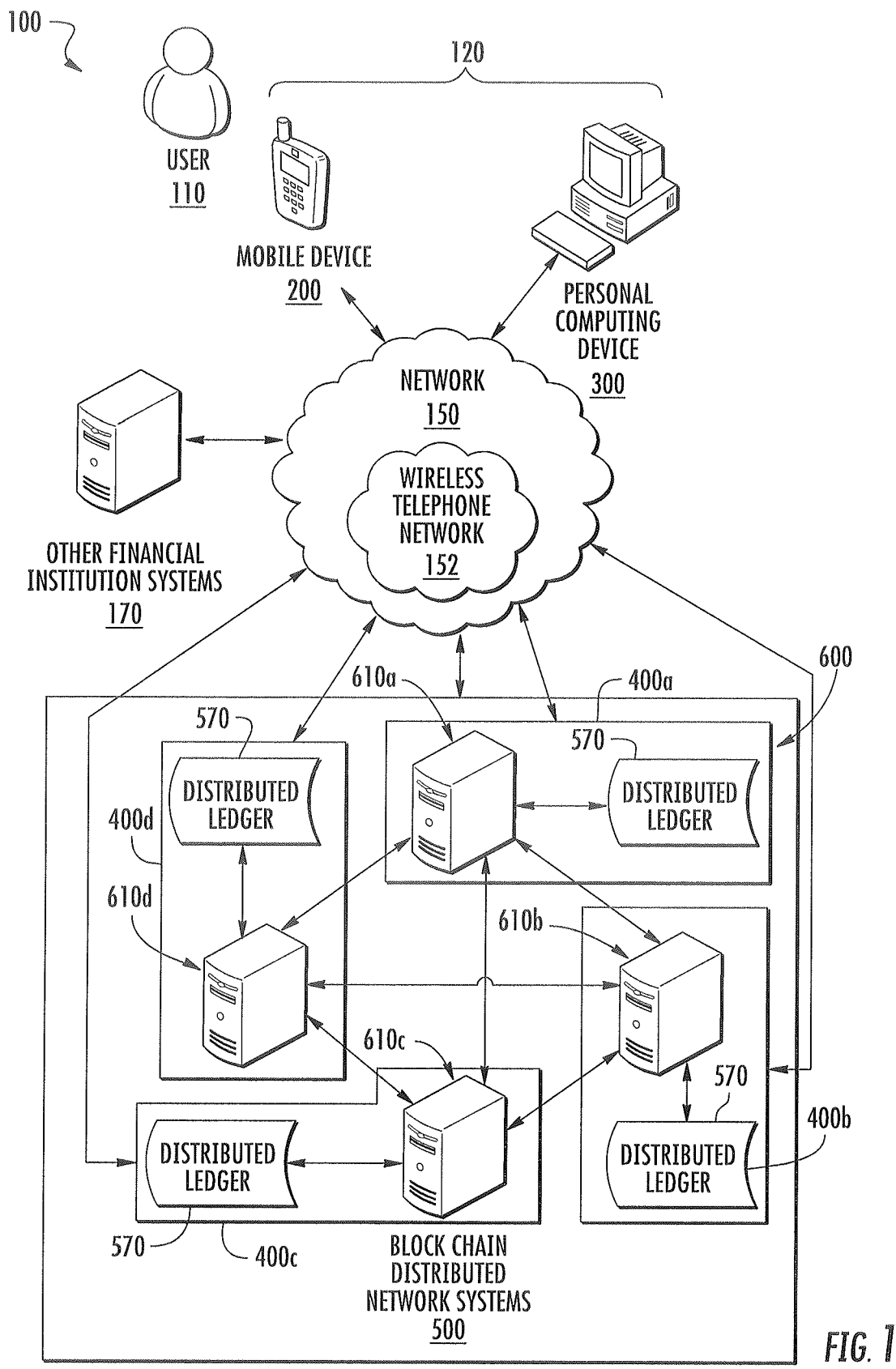
FIG. 1 is a block diagram illustrating a system for external secure access to process data network using block chain distributed network system and environment, in accordance with embodiments of the invention.

FIG. 1 provides a block diagram illustrating a closed loop shared information system and environment 100, in accordance with an embodiment of the invention. As illustrated in FIG. 1, the environment 100 includes a user 110 where the user represents a customer having a relationship with at least one but typically more than one financial institution. A user of the system may be a person, but may also be a business (e.g., a merchant) or any other entity. In a typical environment thousands of users may access the system of the invention.

The environment 100 also may include a computing device 120 for use by the user 110. The computing device 120 may be any device that employs a processor and memory and can perform computing functions, such as a personal computing device 300 or a mobile device 200, that may be connected to or access a network 150. The personal computing device 300 may comprise a personal computer such as a desk top computer, lap top computer or any type of personal computing device that may be connected to a network by landline or wireless access such as wifi. As used herein, the mobile device 200 may comprise any mobile communication device, such as a cellular telecommunications device (i.e., a cell phone or mobile phone), personal digital assistant (PDA), a mobile Internet accessing device, or other mobile device. A mobile device may connect to the network by a cellular telecommunications network or by wifi or other access technology. In some embodiments where, for example, the user is an institution the computing device 120 may comprise servers, access terminals, or the like.

The computing device 120 is configured to communicate over a network 150 with at least one financial institution system(s) 610a of at least one financial institution 400a and, in some cases, with one or more other financial institution systems 610b-610d of additional financial institutions 400b-d that are part of the block chain, as represented by the block chain distributed network systems 500. The mobile device 200, the personal computing device 300, the financial institutions system(s) 610a-610d, the block chain distributed network systems 500, are each described in greater detail below with reference to FIGS. 2-5. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152. The environment may also include other financial institutions/systems 170 that are not part of the block chain 500 but that may be accessed over the network 150 by the user 110 or by the financial institutions 400a-400d.

In general, the computing device 120 is configured to connect with the network 150 to log the user 110 into the financial institution system(s) 610a-610d of one or more of the financial institutions 400a-400d. A user 110 in order to access the user's account(s) typically uses an online banking application and/or mobile banking application on one of the financial institution system(s) 610a-610d and must authenticate with a host financial institution system(s) and/or another system. For example, logging into the financial institution system(s) 610a-610d of one of the financial institutions 400a-400d generally requires that the user 110 authenticate his/her/its identity using a user name, a passcode, a cookie, a biometric identifier, a private key, a token, and/or another authentication mechanism that is provided by the user 110 to the financial institution system(s) 610a-610d via the computing device 120.

The financial institution system(s) 610a-610d are in network communication with the block chain system 500. The financial institution system(s) 610a-610d in the block chain 500 may also communicate with one another over the network 150 outside of the block chain 500. In one embodiment, the invention may provide an application download server such that software applications that support the financial institution system(s) 610a-610d can be downloaded to the computing device 120. In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system(s) 610a-610d.

In some embodiments of the invention, the block chain system 500 is configured to be controlled and managed by one or more third-party data providers (not shown) or other entities over the network 150. In other embodiments, the block chain system 500 is configured to be controlled and managed over the network 150 by the same entity or entities that maintain the financial institution system(s) 610a-610d.

Figure 2:
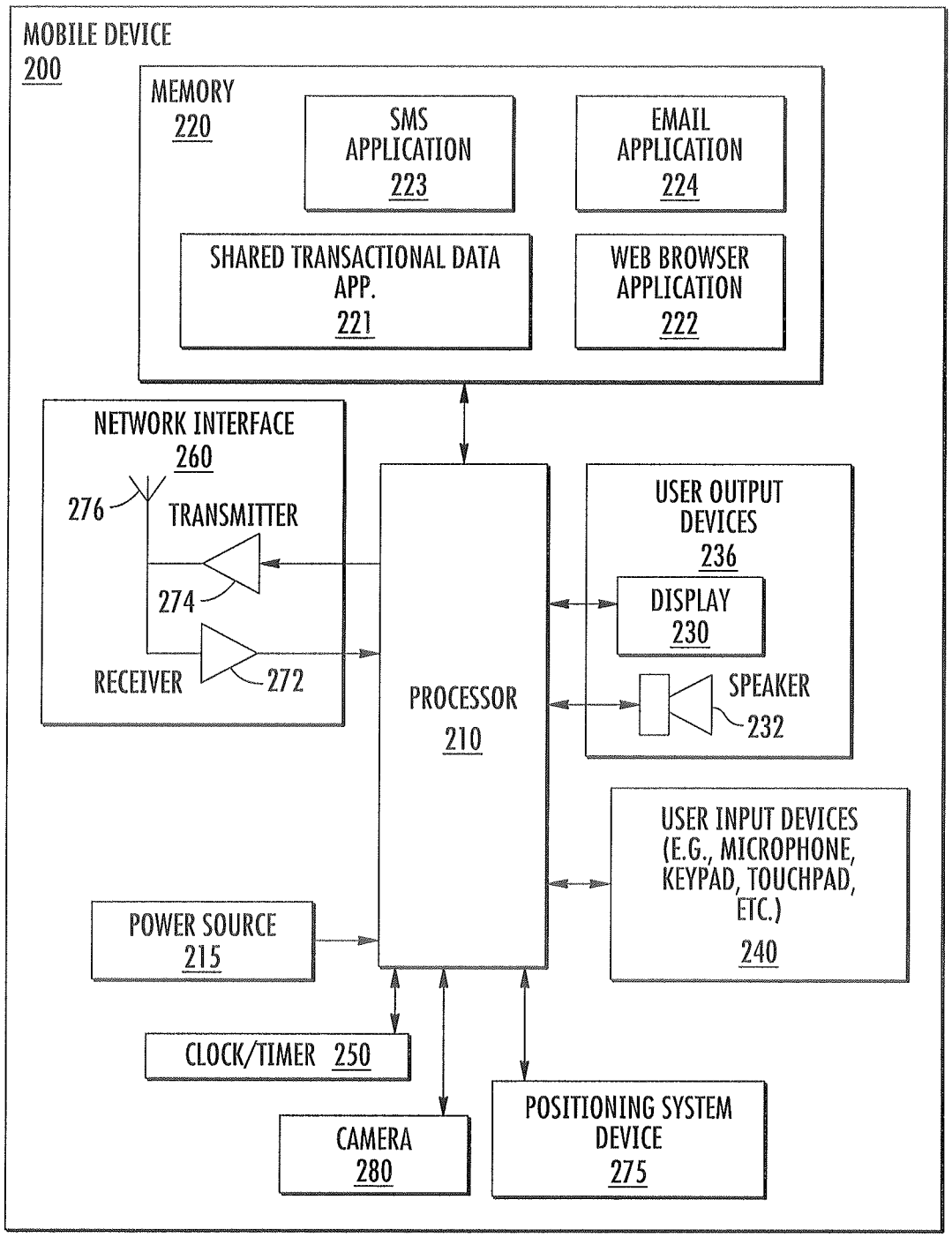
FIG. 2 is a block diagram illustrating the mobile computing device of FIG. 1, in accordance with embodiments of the invention.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s). The user interface may also include a camera 280 and a positioning system device 275.

The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices.

The mobile device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device 200 and/or one or more of the process/method steps described herein. For example, the memory 220 may include such applications as a conventional web browser application 222 and/or a shared transactional data application 221. The shared transactional data application 221 may be used to allow communication with the host institution to implement the system of the invention and access the information on the block chain 500. In other embodiments the user may access the information on the block chain 500 using a web browser application 222. The use of the shared transactional data application 221 may facilitate access to the system of the invention by providing log-in systems including user authentication systems, account information or the like.

These applications also typically provide a graphical user interface (GUI) on the display 230 that allows the user 110 to communicate with the mobile device 200, the financial institution system(s) 610a-610d, and/or other devices or systems. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information, etc.

Figure 3:
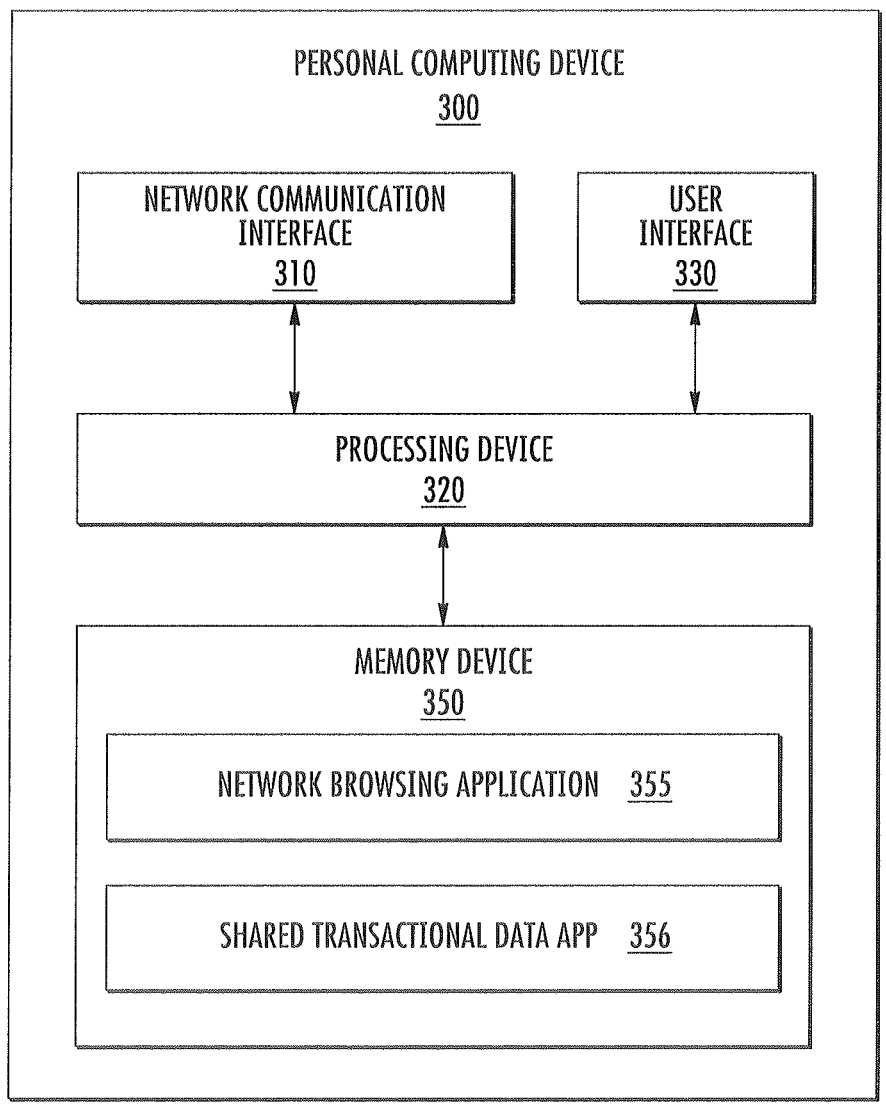
FIG. 3 is a block diagram illustrating the personal computing device of FIG. 1, in accordance with embodiments of the invention.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a financial institution system(s) 400a-400d (shown in FIG. 1).

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein. The memory device 350 may include such applications as a conventional web browser application 355 and/or a shared transactional data application 356. The shared transactional data application 356 may be used to allow communication with the host institution to provide access to information on block chain

500 by providing log-in systems including user authentication systems, account information or the like as previously described.

Figure 4:
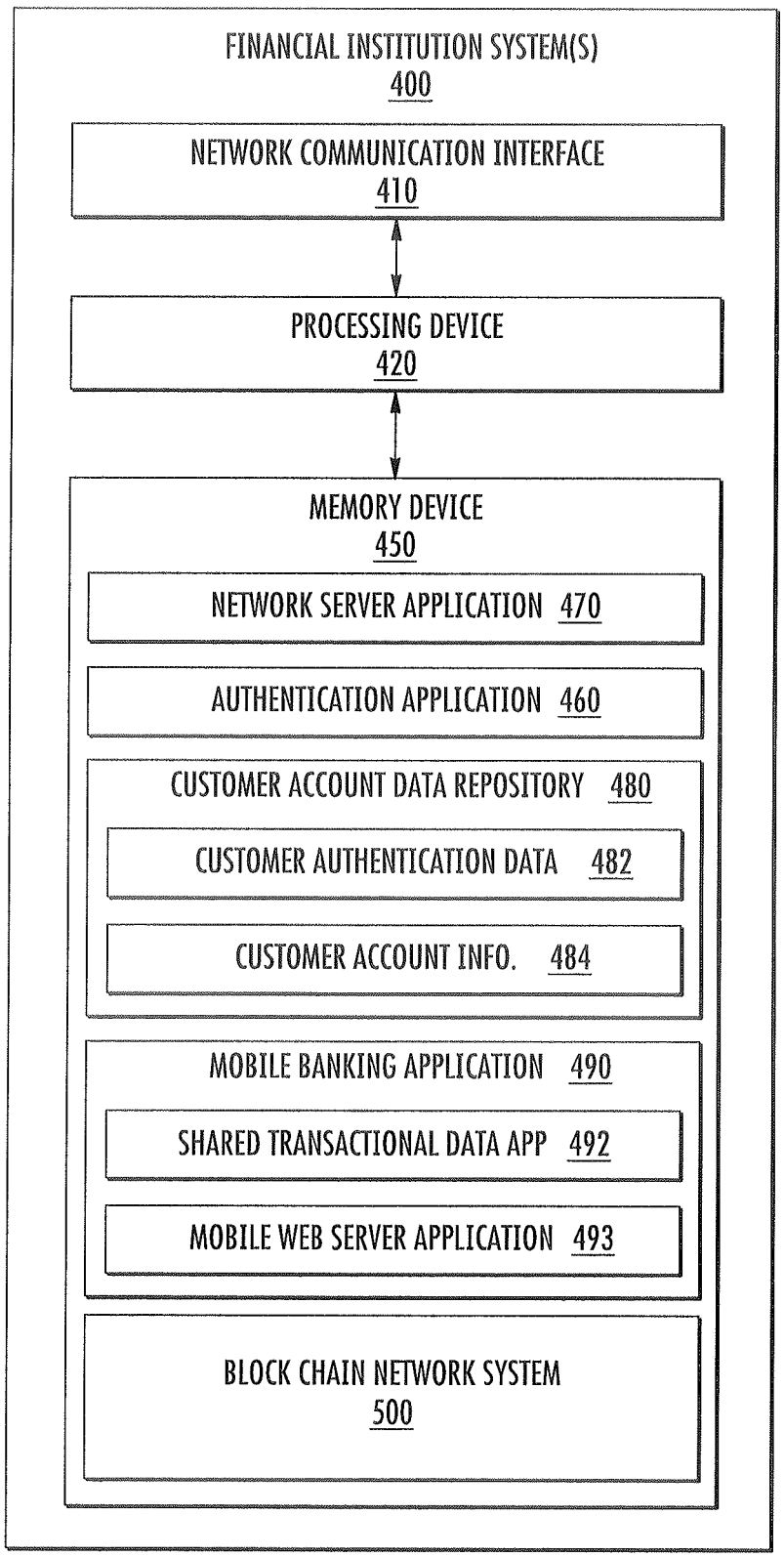
FIG. 4 is a block diagram illustrating the financial institution system(s) of FIG. 1, in accordance with embodiments of the invention.

FIG. 4 provides a block diagram illustrating one of the financial institution system(s) 610a-610d, in greater detail, in accordance with embodiments of the invention. As illustrated in FIG. 4, in one embodiment of the invention, the financial institution system 400 includes one or more processing devices 420 operatively coupled to a network communication interface 410 and a memory device 450. In certain embodiments, the financial institution system 400 is operated by a first entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system 400 described herein. For example, in one embodiment of the financial institution system 400, the memory device 450 includes, but is not limited to, a network server application 470, an authentication application 460, a customer account data repository 480 which includes customer authentication data 480 and customer account information 484, a mobile banking application 490 which includes a shared transaction data application 492, a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400. The shared transaction data application 492 communicates with the user computing devices 120 and more specifically with shared transaction data applications 221, 356 to facilitate communication between the user and the host financial institution to enable access to the information on the block chain.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482, and the shared transaction data interface 492 when authenticating a user to the financial institution system(s) 400. The financial institution system also comprises a block chain network system 500 for interfacing with the block chain network system.

As used herein, a "communication interface" generally includes a modem, server, transceiver, and/or other device for communicating with other devices on a network, and/or a user interface for communicating with one or more customers. Referring again to FIG. 4, the network communication interface 410 is a communication interface having one or more communication devices configured to communicate with one or more other devices on the network 150, such as the mobile device 200, the personal computing device 300, and the block chain systems 500. The processing device 420 is configured to use the network communication interface 410 to transmit and/or receive data and/or commands to and/or from the other devices connected to the network 150.

Figure 5:
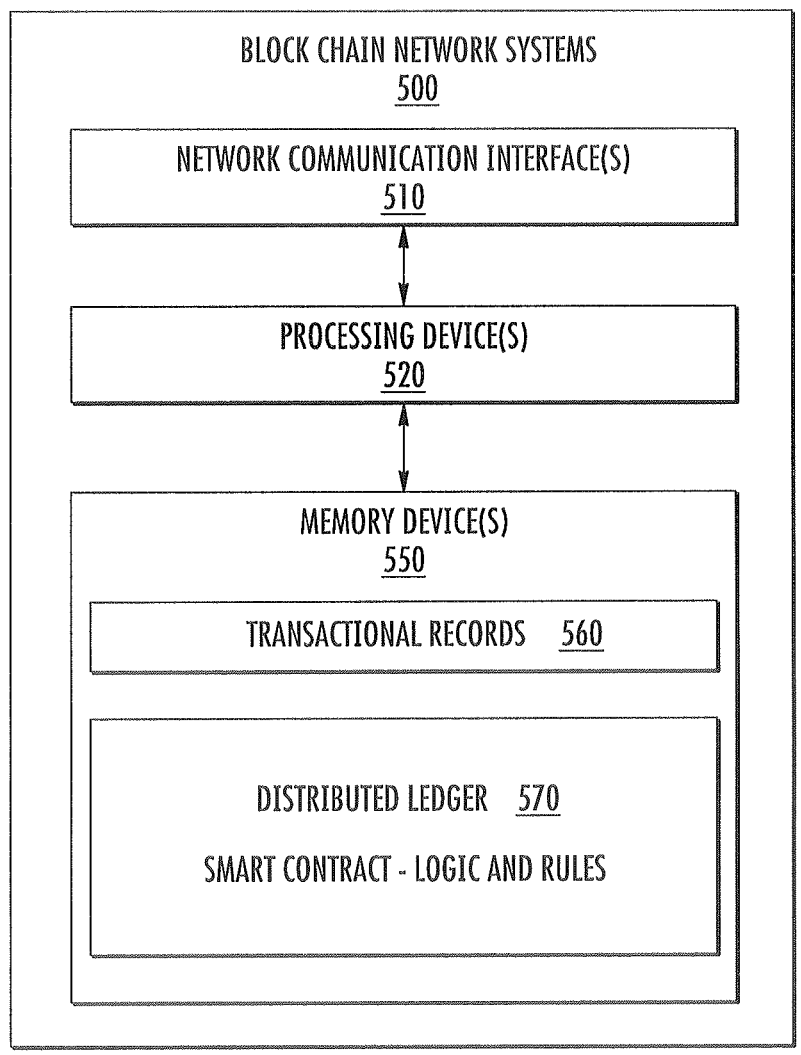
FIG. 5 is a block diagram illustrating the block chain network systems of FIG. 1, in accordance with embodiments of the invention.

FIG. 5 provides a block diagram illustrating block chain network system 500, in accordance with embodiments of the invention. Embodiments of the block chain may include multiple systems, servers, computers or the like maintained by one or many entities. FIG. 5 merely illustrates one of those systems that, typically, interacts with many other similar systems to form the block chain. In one embodiment of the invention, the block chain network system 500 forms part of the financial institution system(s) 610a-610d and are operated by the financial institutions 400a-400d. In some embodiments, the financial institution system(s) are part of the block chain. Similarly, in some embodiments, the block chain network systems 500 are part of the financial institution system(s). As shown in the drawings the processing devices 520, memory devices 560 and network communication interfaces 510 are shown as separate devices from the same devices in the financial institution system 400 of FIG. 4; however, the systems of the block chain network system 500 may share the same structure or some of the same structure with and be implemented by the financial institution system 400.

As illustrated in FIG. 5, one of the block chain network systems 500 generally includes, but is not limited to, a network communication interface 510, a processing device 520, and a memory device 550. The processing device 520 is operatively coupled to the network communication interface 510 and the memory device 550. In one embodiment of the block chain network system 500, the memory device 550 stores, but is not limited to, a system interface 560 and a distributed ledger 570. In some embodiments, the distributed ledger 570 stores data including, but not limited to, member financial institution contract logic and rules. The contract logic and rules controls the operation of the block chain according to the smart contract agreement of the member financial institutions. In one embodiment of the invention, both the program interface 560 and the distributed ledger 570 may associate with applications having computer-executable program code that instructs the processing device 520 to operate the network communication interface 510 to perform certain communication functions involving the distributed ledger 570 described herein. In one embodiment, the computer-executable program code of an application associated with the distributed ledger 570 may also instruct the processing device 520 to perform certain logic, data processing, and data storing functions of the application associated with the distributed ledger 570 described herein.

The network communication interface 510 is a communication interface having one or more communication devices configured to communicate with one or more other devices on the network 150. The processing device 520 is configured to use the network communication interface 510 to receive information from and/or provide information and commands to other block chain network systems 500 via the network 150. In some embodiments, the financial institution system(s) 400 and the block chain network systems 500 are operated by the same entity so that the financial institution controls the various functions of both the block chain network system 500 and the financial institution system(s) 400 such that control over the information maintained by the financial institution remains with the financial institution.

As described above, the processing device 520 is configured to use the network communication interface 510 to gather data, such as data corresponding to transactions, blocks or other updates to the distributed ledger 570 from various data sources such as other block chain network systems 500. The processing device 520 stores the data that it receives in its copy of the distributed ledger 570 stored in the memory device 550.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In the present embodiments the nodes are the financial institution systems 610a-610d of the financial institutions 400a-400d of the block chain system 500. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exists on the ledger, multiple nodes can converge on the most up-to-date version of the transaction. In the case of a financial institution transaction records, any node within the block chain that creates a transaction can determine within a level of certainty whether the transaction can take place and become final according to the terms of that financial institution. The final transaction is designated as an authorized transaction on the block chain.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, meets other criteria.

As mentioned above and referring to FIG. 1, a block chain 500 is typically decentralized—meaning that a distributed ledger 570 is maintained on multiple nodes 610a-d of the block chain 500. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains.

Various other specific-purpose implementations of block chains have been developed. These include distributed domain name management, decentralized crowd-funding, synchronous/asynchronous communication, decentralized real-time ride sharing and even a general purpose deployment of decentralized applications.

For any given financial institution a number of users, and in a typical case a very large number of users, may complete a wide variety of transactions with that financial institution that are made of record with that financial institution to create a historical transaction record. For example, a user may be a user of the financial institution and that customer may engage in banking transactions such as an account holder, loans, credit/debit card transactions, lines of credit or the like. The customer may be a relatively small individual client or a large institutional client. Moreover, the user of one financial institution may also be a user of multiple unrelated financial institutions such that the complete transaction record for the user is held by a number of independent financial institutions where the user can only obtain a the complete transaction record by accessing the transaction record of every financial institution with which that user has a relationship. In the system of the invention all member financial institutions may be part of the block chain such that the complete transaction record of a user of any of the member financial institutions may be made available to that user by the user accessing any one of the financial institutions.

Figure 6:
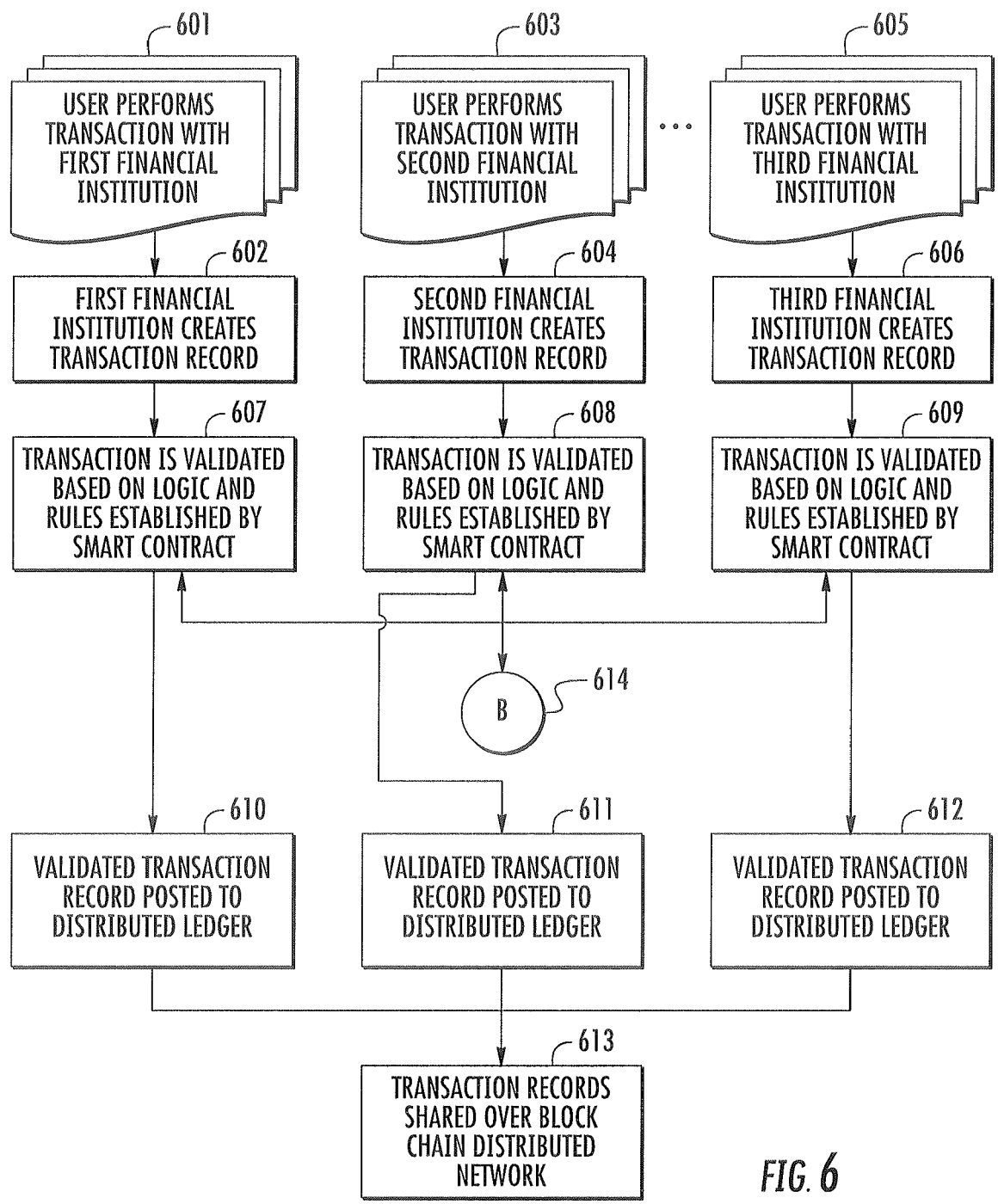
FIG. 6 is a flowchart illustrating a method for using a smart contract block chain for a transaction record sharing system in accordance with embodiments of the invention.

Referring now to FIG. 6, a flowchart illustrating a process and system for using a block chain for validation of secure process transactions according to embodiments of the invention is shown. The financial institution that the user initially accesses as the access point to the block chain network is considered the "host institution" and the systems of the host institution may be referred to as "host systems". A "source institution" is a financial institution other than the host institution that has transaction records of a user and the systems of the source institution may be referred to as "source systems". Financial institutions may function as both source institutions and host institutions depending on whether the financial institution is the access point selected by the user. As shown, a user engages in a transaction with a first financial institution (first source institution) block 601. The first financial institution creates a transaction record which it may maintain in the financial institution's system block 602. The user may perform multiple transactions with the first financial institution creating multiple transaction records. The same user may perform a transaction with a second financial institution (second source institution) block 603. The second financial institution creates a transaction record which it may maintain in the second financial institution's system block 604. The user may perform multiple transactions with the second financial institution creating multiple transaction records. The user may perform transactions with any additional number of financial institutions (additional source institutions), block 605, and each of the additional financial institutions creates a transaction record which it may maintain in that financial institution's system block 606. The user may perform multiple transactions with each of the financial institutions with which that user has a relationship such that multiple institutions may have multiple transaction records with a single user. The transaction records are associated with the smart contract and may include input data, which may be encrypted by the financial system.

Each financial transaction record is validated based on the logic/rules of the smart contract entered into and agreed upon by the member institutions blocks 607, 608, and 609. Smart contracts are computer processes that facilitate, verify and/or enforce negotiation and/or performance of a contract between parties. Smart contracts typically include logic that emulates contractual clauses that are partially or fully self-executing and/or self-enforcing. Smart contract infrastructure can be implemented by replicated asset registries such as the distributed ledgers 570. For example, each node in the block chain distributed network may implement sets of predetermined rules that govern transactions on the network such as posting a verified transaction to the block chain. Each node may also check the work of other nodes and in some cases, as noted above, function verifiers.

The smart contract includes logic stored on one or more of the systems of the block chain, which analyzes the inputted action in light of the logical terms of the smart contract. In some instances, a financial institution posts or records transaction records on the block chain when the smart contract conditions are met. The transactions recorded on the block chain provide visibility and accountability into the operation of the smart contract.

The financial institution accesses the distributed ledger that is updated based on communications from a block chain distributed network block 607a, 607b, 607c. Next, as represented by block 607, 608, 609, using smart contract logic, the system determines whether the indicated transactions meets one or more conditions of the smart contract. This may be considered to validate the transaction record. In response to determining the transaction records meet the condition, the transaction record is validated. The system communicates the validated transaction record to the block chain distributed network by updating the distributed ledger and making the updated ledger available to the block chain network blocks 610, 611, and 612. The validated transaction may include an authentication key or signature that is recognized by member institutions as a validated transaction. The validated transactions on the distributed ledgers 520 may be accessed by each financial institution that is a member of the block chain 500. The member institutions of the block chain 500 may have a complete or partial copy of the entire ledger or set of transactions and/or blocks on the block chain. Transactions that are initiated at one financial institution of the block chain are accessible to the other member institutions of the block chain, block 613, such that the transaction data may be shared between the financial institutions that are members of the block chain. In some embodiments, any of the financial institutions can add any validated transaction to its copy of the block chain, and/or broadcast the validated transaction, in the form of a validated block to other member institutions of the block chain. Other data may be included in the block, such as timestamping, such that each member institution may independently validate the transaction record in the block.

In one embodiment, as shown in FIG. 11, the validation step, block 614, may be performed by the source institution prior to adding the transaction record to the block chain based on the logic and rules from the source institution's distributed ledger, block 1101. The source institution posts the validated transaction record to the block chain with an authentication key or signature that is recognized by other members of the block chain block 1102. The validation may also be performed by one or more of the member financial institutions other than the source institution. For example, in a block chain certain institutions may be designated as validation institutions that in addition to being potential source and/or host institutions operate as validation institutions for all members of the block chain. Referring to FIG. 12, in such an arrangement the transaction record of the source institution (i.e. the financial institution through which the transaction was originally made with the user) is first sent by the source institution to the validation institution block 1201 and the request is validated using information provided with the request to the validation institution based on the logic and rules from the block chain's distributed ledger, block 1202. The validated transaction record may then be posted to the block chain by the validation institution with a signature or authentication key indicating that the transaction is validated block 1203. In other embodiments, as shown in FIG. 13, the transaction record is first sent by the source institution to the validation institution, block 1301, and the request is validated based on information provided with the transaction record at the validation institution block 1302. The validation institution may transmit the signature or authentication key to the source institution, block 1303, and the source institution may post the validated transaction record to the block chain block 1304. In some embodiments the validation institutions may comprise an entity that is not a member financial institution and that does not function as a host or source institution. In such an embodiment the validation institution does not access, maintain or control any user transaction records and only functions to validate the transaction record. Once the transaction record is validated the validation institutions may provide an authentication key or signature to the source institution that is used by the source institution to post the validated transaction record to the block chain.

In various embodiments, the block chain may be configured with a set of rules to dictate when and how transactions are validated and other details about how the network communicates data and the like. In some embodiments, the rules dictate that a source institution must validate all transaction records. In some embodiments, the rules dictate that some or all transaction records may be approved by one or more validation institutions. A validation institution may be one or more of the financial institutions on the block chain that validate transactions for other financial institutions on the block chain. In some such cases, the rules dictate that the transaction record created by a source institution, also includes additional information that is useful in determining whether requests associated with the transaction record should be approved. In other embodiments, the validation institution must reach out to the host institution in certain situations as dictated by the rules. In some embodiments, more than one institution must validate a transaction before it may be posted to the block chain as a validated transaction record.

Figure 7:
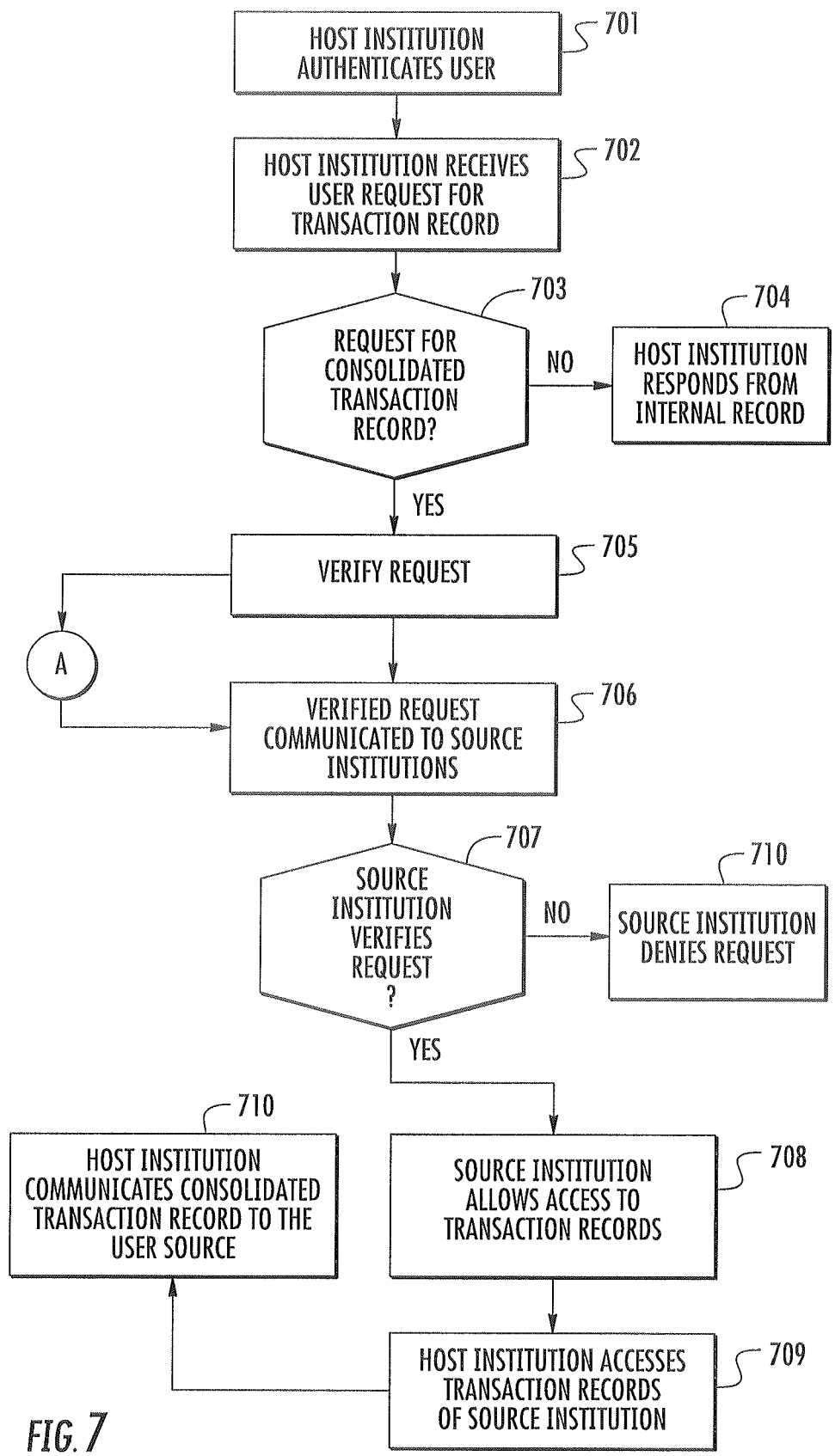
FIG. 7 is a flowchart illustrating a method for using a smart contract block chain for implementing a transaction record sharing system, in accordance with embodiments of the invention.

The user may then access the transaction records of all financial institutions that are members of the block chain by logging in at a single access point. Typically, the access point will be through a computing device 120 such as mobile device 200 or personal computing device 300 as previously described where the user utilizes a user interface application of one of the user's financial institutions. The financial institution that the user initially accesses as the access point to the block chain network is considered the "host institution" and the systems of the host institution may be referred to as "host systems". Referring to FIG. 7, a flowchart illustrating a system for external secure access to process data network according to embodiments of the invention is shown. The user is required to authenticate itself using a login process requiring a password or other identity verification at the host institution, block 701, as previously described. Once the user is verified the user may request access to the user's transaction records. In the system of the invention the user may access not only the transaction records of the host financial institution but also the records of any source institution that is a member of the block chain.

The user makes a request for a transaction record that is received by the host institution block 702. The request is typically made through the host institutions on-line access point using an on-line application of the host institution. While the term "request" is used herein to indicate the user's initiation of the generation of the consolidated record, in some embodiments the request may be the user's initial log-in at the host institution where selected transaction records are automatically generated by the host institution. In this manner the request may be considered the initiation of the system by the host institution rather than a user generated request. The term "request" as used herein means a user generated request and/or a host institution generated request. The host institution determines if the request is for a consolidated transaction record or only requires information from the host institution block 703. The "consolidated transaction record" contemplates transaction records created at any of the member financial institutions as requested by and presented to the user at the computing device 120 that require transaction records from one or more source institutions. The "consolidated transaction record" may be all of the user's transaction records at all financial institutions that are members of the block chain or a subset of the user's transaction records and the term "consolidated transaction record" means the transaction record that is selected from the universe of data available to members of the block chain as requested by the user. To the extent the request requires only information from the host institution the host institution responds from its own internal records block 704. To the extent the user request is for a consolidated transaction record that requires information from member institutions in addition to or other than the host institution, the request is verified according to the logic and rules of the smart contract block 705. The "consolidated transaction record" contemplates transaction records created at any of the member financial institutions as requested by and presented to the user at the computing device 120. The "consolidated transaction record" may be all of the user's transaction records at all financial institutions that are members of the block chain or a subset of all of the user's actual transaction records and is used to denote that the consolidated transaction record is selected from the universe of data available to members of the block chain as requested by the user. A verified request is communicated to the other source institutions requesting that the other institutions make available to the host institution the requested information block 706. The verified request is made based on rules established by all members of the block chain. The request may include a verification such as a signature or authentication key of the host institution that is recognized by the other member institutions and an identification of the user and may include the user's verification information as received by the host institution. The request may include user transaction information such as account numbers, credit/debit card numbers or the like. The next step, as represented by block 707, is for the source institutions to verify the request including, for example, verifying the identity of the host institution and the user based on the verification information provided with the request such as the signature or authentication key of the host institution. If the request cannot be verified, access to the source institution's records is denied block 710. The source institution may provide the host institution with a denied message. If the request is verified the source institution(s) allow access of the host institution to the requested information block 708. The information provided by the source institution to the host institution may be validated in the block chain, as previously described, such that the host institution can verify that the information is being provided by the true source institution. Once access is allowed, the host institution accesses the transaction record of the source institution block 709. The process is repeated for each source institution that has relevant transaction records for the verified request. The host institution assembles and communicates the verified information to the user computing device 120 in the form of a consolidated transaction record block 710. After the host institution accesses the requested transaction data from each of the relevant source institutions, the transaction data is organized and presented to the user personal computing device as a consolidated transaction record. Thus, the use of the block chain allows any member institution to provide data from any other member institution without the need for an aggregator entity that is separate from the member financial institutions.

For example, if a user has a checking account with a first institution, a credit card with a second institution and a line of credit with a third institution, the transaction record of all of the user's transactions with all of the user's financial institutions may be provided as a consolidated transaction record for any institution that is part of the block chain at a single access node—the host institution. The user may request any or all of the transaction records from any member institution such that the consolidated transaction record provided to the user may be the user's complete financial record from all member institutions or it may comprise only a subset of that data as requested by the user. For example a user may make a request from the host institution for the past month of purchases on a credit card held by a source institution that is not the host institution. The host institution would access the information from the source institution and the source institution would allow access to the host institution. The host institution would then provide to the user the requested information as obtained from the source institution.

The use of the block chain contains the transaction information of a user to member institutions of the block chain. The member institutions may establish consistent rules between the institutions for how particular transactions may be classified and reported. As a result, the consolidated transaction record may be used to organize the user's transaction history such that information provided by otherwise independent institutions may follow a common logic.

Figure 8:
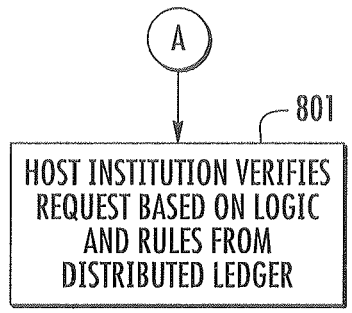
FIG. 8 is a flowchart illustrating a method of verifying a request, in accordance with embodiments of the invention.

As previously explained with respect to block 705 the request is verified. In one embodiment, as shown in FIG. 8, the verification step may be performed by the host institution prior to transmitting the request based on the logic and rules from the host institution's distributed ledger, block 801. The verified request is then sent by the host institution.

The verification may also be performed by one or more of the member financial institutions other than the host institution. For example, in a block chain certain institutions may be designated as verification institutions that in addition to being potential source institutions operate as verification institutions for all members of the block chain.

Figure 9:
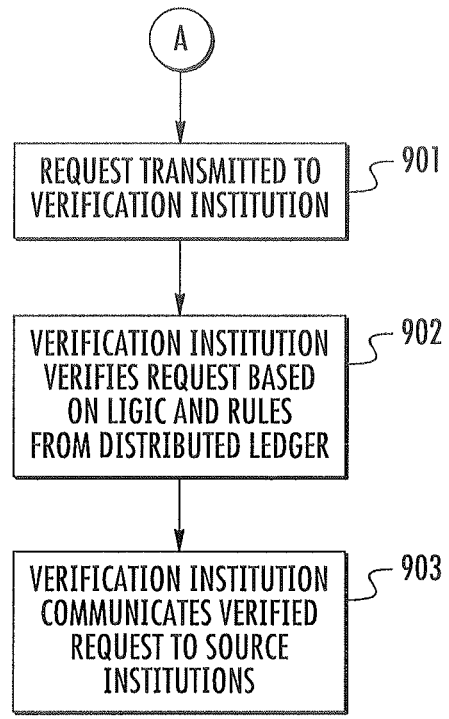
FIG. 9 is a flowchart illustrating another method of verifying a request, in accordance with embodiments of the invention.
Figure 10:
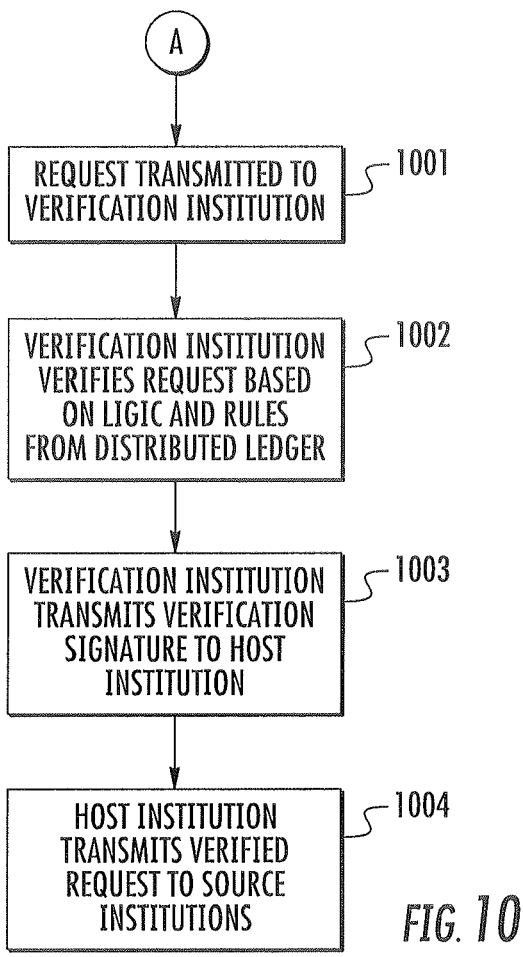
FIG. 10 is a flowchart illustrating still another method of verifying a request, in accordance with embodiments of the invention.

Referring to FIG. 9, in such an arrangement the request is first sent by the host institution to the verification institution, block 901, and the request is verified using information provided with the request at the verification institution based on the logic and rules from the verification institution's distributed ledger, block 902. The verified request may then be forwarded to all source institutions by the verification institution with a signature or authentication key indicating that the request is verified and that all relevant source institutions should make the requested information available to the host institution block 903. In other embodiments, the request is first sent by the host institution to the verification institution, block 1001, and the request is verified based on information provided with the request at the verification institution, block 1002, as described with respect to FIG. 9. The verification institution may transmit the authentication key or signature to the host institution block 1003 and the host institution may transmit the verified request to all source institutions block 1004. In some embodiments the verification institutions may comprise an entity that is not a member financial institution and that does not function as a source institution. In such an embodiment the verification institutions does not maintain or control any user transaction information and only functions to verify the request. Once the request is verified the verification institutions may provide the authentication key or signature to the host institution that is used by the host institution with the request to verify the request to any relevant source institutions.

In various embodiments, the block chain may be configured with a set of rules to dictate when and how requests are approved by the host, source and verification institutions and other details about how the network communicates data and the like. In some embodiments, the rules dictate that a host institution (i.e., a node that places the request on the block chain) must approve all requests for transaction records. In some embodiments, the rules dictate that some or all requests may be approved by one or more verification institutions. A verification institution may be one or more of the financial institutions on the block chain that verify requests and source information for other financial institutions on the block chain. In some such cases, the rules dictate that the transaction record created by a source institution, also includes additional information that is useful in determining whether requests associated with the transaction record should be approved. In other embodiments, the verification institution must reach out to the host institution in certain situations as dictated by the rules.

In various embodiments, any of the nodes 610 may be a verification institution that verifies requests. In some embodiments, more than one of the nodes 610 must validate a request in order for the transaction to be approved. For example, in one embodiment, three verification institutions 610 must validate the authenticity of the request before the request may be approved.

Once the block chain is established the block chain allows financial institutions to share data even where the financial institution systems are not compatible for direct communication. Such an ability may be particularly useful in global financial systems where financial institutions in different geographic areas, such as different countries, have a need to communicate data with one another but have systems that are incompatible for direct communication although the system of the invention may be used in any circumstance where the sharing of information may be useful. Moreover, while the system of the invention has been described with particular reference to the sharing of data for purposes of aggregating user information to create a consolidated transaction record, the sharing of data may be for other purposes than to create a consolidated transaction record.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s).

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 14/942,326 | TRANSPARENT SELF-MANAGING REWARDS PROGRAM USING BLOCKCHAIN AND SMART CONTRACTS | Nov. 16, 2015 |
| 15/041,555 | BLOCK CHAIN ALIAS FOR PERSON-TO-PERSON PAYMENTS | Feb. 11, 2016 |
| 62/253,935 | BLOCK CHAIN ALIAS PERSON-TO-PERSON PAYMENT | Nov. 11, 2015 |
| 15/041,566 | BLOCK CHAIN ALIAS PERSON-TO-PERSON PAYMENTS | Feb. 11, 2016 |
| 15/050,375 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 15/050,358 | SYSTEM FOR PROVIDING LEVELS OF SECURITY ACCESS TO A PROCESS DATA NETWORK | Concurrently Herewith |
| 62/293,585 | SYSTEM FOR SECURE ROUTING OF DATA TO VARIOUS NETWORKS FROM A PROCESS DATA NETWORK | Feb. 10, 2016 |
| 62/293,620 | SYSTEM FOR CENTRALIZED CONTROL OF SECURE ACCESS TO PROCESS DATA NETWORK | Feb. 10, 2016 |
| 15/049,605 | SYSTEM FOR CONTROL OF SECURE ACCESS AND COMMUNICATION WITH DIFFERENT PROCESS DATA NETWORKS WITH SEPARATE SECURITY FEATURES | Concurrently Herewith |
| 15/049,716 | SYSTEM FOR CONTROL OF DEVICE IDENTITY AND USAGE IN A PROCESS DATA NETWORK | Concurrently Herewith |
| 15/049,777 | SYSTEM FOR ESTABLISHING SECURE ACCESS FOR USERS IN A PROCESS DATA NETWORK | Concurrently Herewith |
| 15/049,835 | SYSTEM FOR ALLOWING EXTERNAL VALIDATION OF DATA IN A PROCESS DATA NETWORK | Concurrently Herewith |
| 15/050,094 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 15/050,098 | SYSTEM FOR TRACKING AND VALIDATION OF MULTIPLE INSTANCES OF AN ENTITY IN A PROCESS DATA NETWORK | Concurrently Herewith |
| 62/287,301 | SYSTEM FOR TRACKING AND VALIDATION OF MULTIPLE INSTANCES OF AN ENTITY IN A PROCESS DATA NETWORK | Jan. 26, 2016 |
| 15/050,084 | SYSTEM FOR TRACKING AND VALIDATION OF AN ENTITY IN A PROCESS DATA NETWORK | Concurrently Herewith |
| 62/287,298 | SYSTEM FOR TRACKING AND VALIDATION OF AN | Jan. 26, 2016 |

-continued

| U.S. patent application Ser. No. | Title | Filed On |
|---|---|---|
| | ENTITY IN A PROCESS DATA NETWORK | |
| 15/050,372 | SYSTEM FOR ROUTING OF PROCESS AUTHORIZATIONS AND SETTLEMENT TO A USER IN A PROCESS DATA NETWORK | Concurrently Herewith |
| 15/050,285 | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 15/050,292 | SYSTEM FOR GRANT OF USER ACCESS AND DATA USAGE IN A PROCESS DATA NETWORK | Concurrently Herewith |
| 15/050,294 | SYSTEM FOR IMPLEMENTING A DISTRIBUTED LEDGER ACROSS MULTIPLE NETWORK NODES | Concurrently Herewith |
| 15/049,865 | SYSTEM FOR EXTERNAL VALIDATION OF PRIVATE-TO-PUBLIC TRANSITION PROTOCOLS | Concurrently Herewith |
| 15/049,852 | SYSTEM FOR EXTERNAL VALIDATION OF DISTRIBUTED RESOURCE STATUS | Concurrently Herewith |
| 15/050,316 | SYSTEM FOR TRACKING TRANSFER OF RESOURCES IN A PROCESS DATA NETWORK | Concurrently Herewith |
| 15/050,321 | SYSTEM FOR MANAGING SERIALIZABILITY OF RESOURCE TRANSFERS IN A PROCESS DATA NETWORK | Concurrently Herewith |
| 15/050,307 | SYSTEM TO ENABLE CONTACTLESS ACCESS TO A TRANSACTION TERMINAL USING A PROCESS DATA NETWORK | Concurrently Herewith |

The invention claimed is:

1. A system operatively connected with a block chain distributed network and for using the block chain distributed network for providing non-monetary transaction information to a user, the system comprising:
a memory device storing logic and rules for the block chain; and
a processing device operatively coupled to the memory device, wherein the processing device is configured to execute computer-readable program code to:
receive a request for a consolidated transaction record from a user, wherein the consolidated transaction record is a record of transactions from multiple source institutions;
verify the request based on transmission of the request to a smart contract block on the block chain distributed network for determining whether the request meets a condition of the block chain, wherein meeting the condition of the block chain includes identification of a verified authentication key of a host institution that is recognized by other member institutions;
initiate transmission of a verified request for a transaction record to at least one source institution of the multiple source institutions;
access the transaction record from the at least one source institution;
transmit the consolidated transaction record to a user computing device, wherein the consolidated transaction record comprises a record of all transactions from multiple source institutions; and
display the consolidated transaction record comprising the record of all transactions from multiple source institutions via the user computing device, wherein the user computing device further comprises a graphical user interface application.

2. The system of claim 1, wherein the processing device is configured to execute computer-readable program code further to:
create the consolidated transaction record comprising a plurality of transaction records.

3. The system of claim 2, wherein the processing device is configured to execute computer-readable program code further to:
communicate the consolidated record to a user computing device.

4. The system of claim 1, wherein the processing device is configured to execute computer-readable program code further to:
communicate verification of the request to the block chain distributed network.

5. The system of claim 2, wherein the processing device is configured to execute computer-readable program code further to:
update a distributed ledger with information indicating verification of the request.

6. The system of claim 1, wherein the processing device is configured to execute computer-readable program code further to:
initiate the transmission of a verified request by transmitting a verified request.

7. The system of claim 1, wherein the processing device is configured to execute computer-readable program code further to:
initiate the transmission of a verified request by transmitting a request to a verification institution.

8. A method for execution on a closed-loop system operatively connected with a block chain distributed network, the method for using the block chain distributed network for facilitating operation of a transaction record sharing system, the method comprising:
receiving a request for a consolidated transaction record from a user, wherein the consolidated transaction record is a record of transactions from multiple source institutions;
verifying the request based on transmission of the request to a smart contract block on the block chain distributed network for determining whether the request meets a condition of the block chain, wherein meeting the condition of the block chain includes identification of a verified authentication key of a host institution that is recognized by other member institutions;
initiating transmission of a verified request based on the consolidated transaction record for a transaction record to at least one source institution of the multiple source institutions;
accessing the transaction record from the at least one source institution;

transmitting the consolidated transaction record to a user computing device, wherein the consolidated transaction record comprises a record of all transactions from multiple source institutions; and displaying the consolidated transaction record comprising the record of all transactions from multiple source institutions via the user computing device, wherein the user computing device further comprises a graphical user interface application.

9. The method of claim 8, further comprising creating a consolidated record comprising a plurality of transaction records.

10. The method of claim 9, further comprising transmitting the consolidated record to a user computing device.

11. The method of claim 8, further comprising communicating verification of the request to the block chain distributed network.

12. The method of claim 8, further comprising updating a distributed ledger with information indicating verification of the request.

13. The method of claim 8, wherein the step of determining whether the request meets a condition of the block chain comprises transmitting the request to a validation institution.

14. The method of claim 8, wherein the step of determining whether the request meets a condition of the block chain comprises receiving a signature from a validation institution.

15. The method of claim 8, wherein the step of transmitting a verified request for the transaction information comprises transmitting the verified request from a verification institution.

16. The method of claim 8, wherein the step of transmitting a verified request for the transaction information comprises transmitting the verified request from a host institution.

17. A computer program product for execution on a system operatively connected with a block chain distributed network, the computer program product for using the block chain distributed network for facilitating operation of a transaction record sharing system, the computer program product comprising at least one non-transitory computer-readable medium having computer-readable program code portions embodied therein, the computer-readable program code portions comprising:

an executable portion configured to receive a request for a consolidated transaction record from a user, wherein the consolidated transaction record is a record of transactions from multiple source institutions;

an executable portion configured to verify the request based on transmission of the request to a smart contract block on the block chain distributed network for determining whether the request meets a condition of the block chain, wherein meeting the condition of the block chain includes identification of a verified authentication key of a host institution that is recognized by other member institutions;

an executable portion configured to initiate transmission of a verified request for a transaction record based on the consolidated transaction record to at least one source institution of the multiple source institutions;

an executable portion configured to access the transaction record from the at least one source institution;

an executable portion configured to transmit the consolidated transaction record to a user computing device, wherein the consolidated transaction record comprises a record of all transactions from multiple source institutions; and an executable portion configured to display the consolidated transaction record comprising the record of all transactions from multiple source institutions via the user computing device, wherein the user computing device further comprises a graphical user interface application.

18. The computer program product of claim 17, further comprising an executable portion configured to create the consolidated transaction record comprising a plurality of transaction records.

19. The computer program product of claim 17, further comprising an executable portion configured to communicate the consolidated record to a user computing device.

20. The computer program product of claim 17, further comprising an executable portion configured to communicate verification of the request to the block chain distributed network.

* * * * *